United States Patent [19]

Raszewsi

[11] Patent Number: 4,790,433

[45] Date of Patent: Dec. 13, 1988

[54] PACKAGING COMBINATION

[75] Inventor: Lewis R. Raszewsi, Stevensville, Md.

[73] Assignee: The Crowell Corporation, Newport, Del.

[21] Appl. No.: 99,727

[22] Filed: Sep. 22, 1987

Related U.S. Application Data

[63] Continuation-in-part of Ser. No. 82,794, Aug. 6, 1987, and a continuation-in-part of Ser. No. 940,566, Dec. 12, 1986, Pat. No. 4,698,254, and a continuation-in-part of Ser. No. 873,819, Jun. 13, 1986, each is a continuation-in-part of Ser. No. 783,430, Oct. 4, 1985, Pat. No. 4,693,056.

[51] Int. Cl.$^4$ .................. B65D 69/00; B65D 73/02; B32B 3/26
[52] U.S. Cl. .................. 206/329; 53/450; 53/463; 206/225; 428/215; 428/315.5; 428/315.9
[58] Field of Search .................. 53/450, 463, 477; 206/223, 225, 245, 328, 329, 454; 428/213, 215, 315.5, 315.7, 315.9

[56] References Cited

U.S. PATENT DOCUMENTS

| | | | |
|---|---|---|---|
| 3,653,498 | 4/1972 | Kisor | 206/329 |
| 4,321,297 | 3/1982 | Adelman | 428/315.9 |
| 4,584,225 | 4/1986 | Adelman | 428/315.7 |
| 4,601,157 | 7/1986 | Adelman | 53/450 |
| 4,693,056 | 9/1987 | Raszewski | 53/450 |
| 4,698,254 | 10/1987 | Raszewski | 428/315.5 |

FOREIGN PATENT DOCUMENTS

| | | | |
|---|---|---|---|
| 85/04150 | 9/1985 | PCT Int'l Appl. | 53/450 |
| 87/01092 | 2/1987 | PCT Int'l Appl. | 53/463 |

*Primary Examiner*—William J. Van Balen
*Attorney, Agent, or Firm*—Connolly & Hutz

[57] ABSTRACT

Integrated circuit with leads extending essentially in one direction is packaged by pushing it against layer of crisp foam that can be electrically conductive, to cause the leads to penetrate into the foam. The integrated circuit is then covered with a plastic film that is adhered to the foam around the integrated circuit. Anti-stat coatings are applied on the various surfaces, and plastic film can be metallized.

7 Claims, 1 Drawing Sheet

PACKAGING COMBINATION

This application is in part a continuation of applications Ser. No. 82,794 filed Aug. 6, 1987, Ser. No. 940,566 filed Dec. 12, 1986 (U.S. Pat. No. 4,698,254 granted Oct. 6, 1987), and Ser. No. 873,819 filed June 13, 1986, all three of which in turn are continuations-in-part of earlier application Ser. No. 783,430 filed Oct. 4, 1985 (U.S. Pat. No. 4,693,056 granted Sept. 15, 1987).

The present invention relates to packaging, and more particularly to packaging for electronic devices.

Among the objects of the present invention is the provision of novel packaging arrangements having very high effectiveness.

Figure 1:
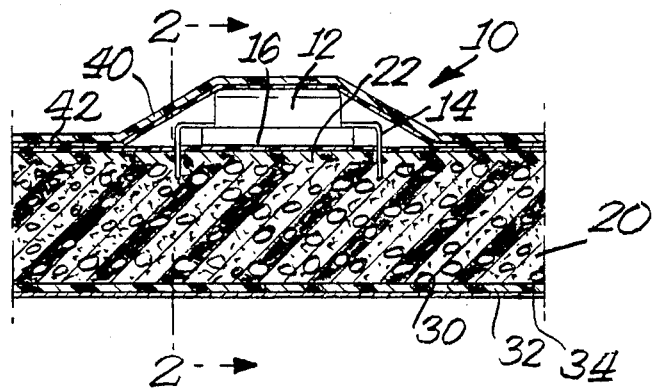
Figure 2:
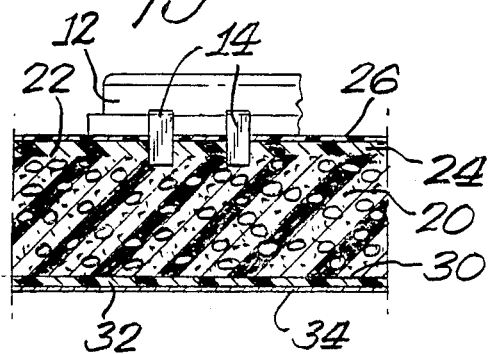

The foregoing as well as additional objects of the present invention will be more fully understood from the following description of several of its exemplifications, reference being made to the accompanying drawings in which:

FIG. 1 is a vertical sectional view of a package representative of the present invention, and FIG. 2 is a sectional view taken along line 2—2 of the package of FIG. 1.

According to the present invention a packaging assembly for an integrated circuit having a number of connector leads projecting in the same direction, has a layer of electrically conductive crisp plastic foam about 5 to about 8 millimeters thick, an anti-stat cohesive-nonadhesive coating on a first face of the foam layer, a metallized polyethylene terephthalate film about 25 microns thick laminated to the opposite face of the foam, an antistat coating on the outer face of the film, the integrated circuit being mounted on a central portion of said first foam face with said leads penetrating through that face into the foam, the integrated circuit being covered by a second metallized polyethylene terephthalate film that has one of its faces coated with an anti-stat cohesive-nonadhesive layer and has that face adhered to the anti-stat cohesive-nonadhesive layer on the foam around the integrated circuit.

The foam can be made electrically conductive by loading with finely divided carbon the resin from which it is formed. An electrical conductivity of about 1 to about 5 ohms per square is very effective.

The metallizing of the polyethylene terephthalate should be sufficiently heavy to reflect at least 40% of incident light. The polyethylene terephthalate film covering the integrated circuit is preferably more heavily metallized to reflect at least about 98% of incident light.

Turning now to the drawings, FIG. 1 shows a package 10 having a multipin integrated circuit 12, with its pins 14 all projecting in the same direction—in this case downwardly. Such a pin arrangement is standard, with most integrated circuits having two rows of pins, and from about 3 to about 50 pins in each row. Each pin is generally flat sheet metal about 1 millimeter wide when viewed as FIG. 2, and about $\frac{1}{3}$ millimeter thick. They project downwardly about 3 to about 7 millimeters below the bottom plane 16 of the integrated circuit.

Each of the pins 14 is embedded in a layer 20 of electrically conductive foam. The foam is a crisp one and not too cushiony, so that the mere pushing of the integrated circuit against the face 22 of the foam will cause the pins to cut their way into the illustrated position. The foam is preferably of open-cell construction with an electrical conductivity of about 4 ohms per square and is available as a commercial product that has essentially no cushiony resilience and a density of about $\frac{1}{8}$ gram per cubic centimeter.

Before the integrated circuit is pushed into place, the foam face 22 is coated with a primer layer 24 applied as a high viscosity composition, and after layer 24 is dried, an anti-stat cohesive-nonadhesive coating 26. Primer layer 24, of an acrylic resin thickener in aqueous solution for example, sets to bridge across the open cells at foam face 22 and thus keeps layer 26 from penetrating too deeply into the foam. Layer 26 is preferably the composition of Example 3 in PCT application US 86/01731, published Feb. 26, 1987 under No. WO 87/01092, and after drying has a coating weight of about 1 to about 10 grams per square decimeter. It also shows a static discharge time of about 0.2 seconds.

The lower face 30 of foam layer 20 has laminated to it a film 32 of polyethylene terephthalate about 25 microns thick carrying a metallized coating 34. The polyurethane can be cast against the film 32, or the film can be applied to pre-formed foam with a laminant such as hot melt pressure-sensitive adhesive. Several of such adhesive are disclosed in the PCT application. Other good laminants are hydrocarbon resins such as modified or unmodified rosin, preferably mixed with up to $\frac{1}{3}$ of its weight of amorphous polypropylene. Amorphous poly alpha olefins in general are satisfactory. The metallized layer can also be covered with an anti-stat layer such as that disclosed in 82,794 filed Aug. 6, 1987.

Film 30, although exceedingly thin, securely supports the foam which is not very thick, and keeps it from being torn apart or significantly damaged in handling.

Another film 40 of polyethylene terephthalate covers the integrated circuit 12 and is adhered to the cohesive-nonadhesive layer 26. To this end film 40 has its under surface also coated with a cohesive-nonadhesive layer 42. Both faces of film 0 can be metallized and its outer face can also be coated with an anti-stat layer but this is not essential.

The integrated circuit packaged as in FIG. 1, is exceedingly secure. The pins are essentially short-circuited to each other so that no significant voltages can be developed at the pin circuits. The anti-stat layers keep electrical fields from being developed internally in the integrated circuit.

A block of foam packaging about 10 centimeters square will be more than adequate to hold even the largest integrated circuit. In general there should be a margin of at least about 15 millimeters wide around the integrated circuit to allow for secure adhesion of the covering film 40.

Instead of foam layer 20 being polyurethane, it can be polystyrene and instead of being coated with carbon particles, it can have organic anti-stat distributed through it as in U.S. Pat. No. 4,608,394.

Polyethylene makes a very inexpensive foam for general use, and when corona-treated laminates well to paper or other supporting backers with amorphous poly alpha olefins that are blended with about 1/5 their weight of rosin type adhesives.

Such a laminate of polyethylene to polyethylene terephthalate can be used in place of the corresponding laminate of FIGS. 1 and 2, without loading the polyethylene with electrically conductive particles. Protection against electric fields is provided by the anti-stat characteristics of the layers containing anti-stat.

If desired the foam face 22 can be painted with an electrically conductive paint such as ones containing a suspension of silver particle in high concentration. This paint can be applied before the cohesive-nonadhesive coating 26, or if applied over the cohesive-nonadhesive coating, can be applied to only the central portion of the foam.

An integrated circuit that also contains one or more additional leads pointed in a direction different from that of leads 14, can have a second piece of crisp foam applied so that it is penetrated by and held against the additional leads. The covering film 40 can then cover the second piece of foam as well as the integrated circuit. The covering film 40 can be replaced by the laminate of FIG. 2 regardless of the construction of the intergrated circuit.

While the foregoing lead configurations are used with integrated circuits, other types of electrical devices have circuits which are not entirely of the integrated circuit type. These can also be packaged the same way.

Obviously many modifications and variations of the present invention are possible in the light of the above teachings. It is, therefore, to be understood that within the scope of the appended claims the invention may be practiced otherwise than as specifically described.

I claim:

1. A packaging assembly for an integrated circuit having a number of connector leads projecting in essentially the same direction, the assembly having a layer of electrically conductive crisp plastic foam about 5 to about 8 millimeters thick, an anti-stat cohesive-nonadhesive coating on a first face of the foam layer, a polyethylene terephthalate film about 25 microns thick laminated to the opposite face of the foam, an anti-stat coating on said film, the integrated circuit being mounted on a central portion of said first foam face with said leads penetrating through that face into the foam, the integrated circuit being covered by a second polyethylene terephthalate film that has one of its faces coated with an anti-stat cohesive-nonadhesive layer and has that face adhered to the anti-stat cohesive-nonadhesive layer on the foam around the integrated circuit.

2. The combination of claim 1 in which the foam is loaded with particles of carbon, and the first polyethylene terephthalate film is metallized on its foam-engaging face to about a 40% light reflectivity.

3. The combination of claim 1 in which the second polyethylene terephthalate film is metallized to at least about 95% light reflectivity.

4. A packaging laminate of crisp electrically conductive plastic foam about 5 to about 8 millimeters thick laminated on one face to a film of metallized polyethylene terephthalate about 25 microns thick, the outer face of the foam being coated with an anti-stat cohesive-nonadhesive layer, and the outer face of the film being coated with an anti-stat layer.

5. A packaging combination of
(a) a roll of the laminate of claim 4, and
(b) a roll of metallized polyethylene terephthalate film coated on one face with an anti-stat cohesive-nonadhesive layer.

6. The combination of claim 1 in which the foam is open-celled.

7. The combination of claim 4 in which the foam is open-celled and under its outer face coating the open-cell foam surface is first coated with a primer layer that essentially seals that face.

* * * * *